May 2, 1944. J. J. SCHMELZ 2,347,752
BRIDLE
Filed Feb. 28, 1941
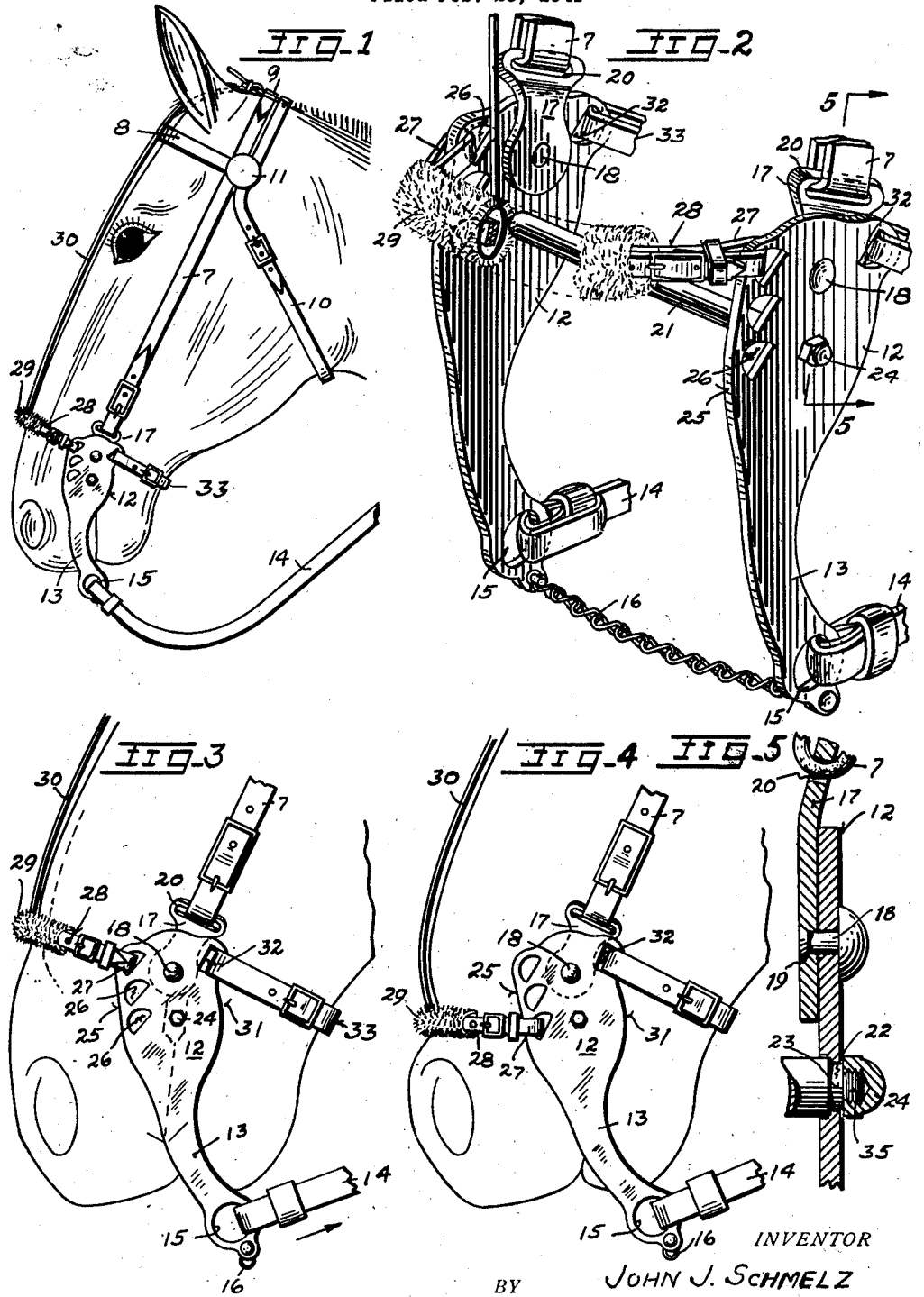
INVENTOR
JOHN J. SCHMELZ
BY Henry N. Young
ATTORNEY Patented May 2, 1944

2,347,752

UNITED STATES PATENT OFFICE 2,347,752

BRIDLE

John J. Schmelz, Contra Costa County, Calif.

Application February 28, 1941, Serial No. 381,008

5 Claims. (Cl. 54—6)

The invention relates to a bridle for an equine animal.

An object of the invention is to provide a bridle having an improved and adjustably variable hackamore action upon the nose of the animal wearing it.

A further obect is to provide for the optional use of a mouth piece or bit in non-rigid connection with the cheek-plates of the bridle.

Another object is to so mount the bit in the cheek-plates as to avoid any possible pinching of the animal's lips at the bit ends.

An added object is to provide a bridle having a structure and action which are particularly useful in the breaking and training of an equine animal to bridle control.

The invention possesses other objects and features of advantage, some of which, with the foregoing, will be set forth or be apparent in the following description of a typical embodiment thereof, and in the accompanying drawing, in which, Figure 1 shows a bridle embodying the present features of invention and mounted on a horse's head, the control reins being slack.

Figure 2 is an enlarged fragmentary and perspective view of the control portions of the bridle, including the cheek-plates and the elements attached thereto.

Figures 3 and 4 are somewhat diagrammatic views illustrating different degrees of hackamore action which are possible with the present bridle.

Figure 5 is an enlarged fragmentary section taken at the line 5—5 in Figure 2.

As is well known, the hackamore method of control generally comprises the tightening of a band or loop about the nose of an equine animal such as a horse. Such an action was originally obtained by pulling a loop upwardly on the naturally tapered nose of a horse to effect a wedged tightening of the loop on the nose. A later and generally better device for providing the nose-gripping hackamore action is one in which the control loop is arranged to be tightened in its effective plane by a reins-controlled lever means, and it is to a device for accomplishing this type of hackamore control that the present invention particularly relates.

As particularly disclosed, the features of my invention are included in the structure of a bridle having a usual head stall portion comprising cheek straps 7, a brow band 8, a crown piece 9 and a throat latch 10, all joined by rosettes 11 at the opposite bridle sides. The cheek straps 7 are of adjustable length and provide the necessary support for complementary cheek-plates 12 of rigid material having control arms 13 extending therefrom generally oppositely from the cheek straps; the present arms 13 comprise integral extensions of the plates. Control reins 14 are attached to suitable eyes 15 provided at the lower ends of the arms 13, and said arm extremities may also be connected by a flexible guard chain 16 for preventing the passage of the reins or a rope between the cheek-plates and the opposed side of the nose of an animal wearing the bridle, the mounting of the bridle on the head of a horse being shown for purposes of illustration.

For a reason which will hereinafter be apparent, the effective attachment point between each cheek strap 7 and its cheek-plate 12 is preferably somewhat below the top end of the plate; as shown, a plate 17 is attached to each cheek-plate 12 and against its inner face by a pivot pin 18 engaged in a plate hole 19, and the free upper end of the member 17 is provided with an elongated eye 20 for receiving the lower and flat end of a cheek strap 7 for securing the member and strap together. Means are provided for securing a suitable mouth piece or bit 21 to and between the cheek-plates 12, said means including transverse openings 22 below the pivot pins 18 and in which reduced bit end portions 23 may extend for threadedly mounting cap nuts 24 at their extremities to secure the bit to the cheek-plates. For descriptive convenience, a line of each cheek-plate at the plane of the plate openings 19 and 22 thereof will herein be considered and referred to as the longitudinal or length line of the plate. In the present cheek-plates 12, the holes for the pin and bit end at each plate are spaced about one and one-fourth inches apart as comprising a suitable spacing thereof for a cheek-plate to be used with a bridle for a riding horse of usual size.

It will now be noted that each cheek-plate is relatively wide at its upper portion which provides the pin and bit-receiving holes 19 and 22 respectively; as shown, the front edge 25 of this plate portion is parallel to the longitudinal line of the plate and is slightly further from said line than is the spacing of the holes 19 and 22. A line of holes 26 is provided through each plate 12 adjacent its front edge 25, said holes being arranged for the selective attachment thereat of the loop ends 27 of a nose or bosal band 28 of adjustable length and arranged for arched disposal around the front of the nose of an animal wearing the bridle. The bosal band 28 may be of any suitable material and structure, provided that it is appropriately flexible in the plane of its bend, and may mount a soft and flexible tubular sheath 29 for bearing engagement with the animal's nose. Preferably, and as shown, a flexible strap or thong 30 extends from a front point of the band 28 to a connection with a higher point of the head-stall, as at the top of the crown piece 9, for supporting the band in adjusted angular relation to the longitudinal line of the cheek-plate, said strap being of adjustable length and being passed over or under the brow band 8 as may be desired.

At least the upper portion of the back edge 31 of each cheek-plate 12 is spaced from the before identified length line of the plate by a distance approximating the spacing of the edge 25 from said line. A hole 32 is provided in the upper rear portion of the plate for the attachment thereat of a chin or curb band 33 which is arched under the horse's chin. The curb strap 33 is flexible, at least in the plane of its bend, is of adjustable length, and has end loops engaged through the holes 32. As shown, each hole 32 and the upper hole 26 define a line which is substantially perpendicular to the length line of the plate and passes slightly above the pivot axis at the pivot pin 18. With the three holes shown, straight lines from the intermediate and bottom holes 26 to the hole 32 also pass close to the pivot axis at the pin 18.

It will now be noted that the various holes 26 and 32, which provide attachments points for the bosal and chin straps 28 and 33 respectively, are D-shaped, with their straight side portions defining angles of approximately forty-five degrees with the length line of the cheek-plate, and with their lower ends furthest from said length line in the case of the holes 26 and nearest said length line in the case of the hole 32. With respect to the holes 26, their present form and disposal permits a closer spacing thereof in their line than would be permitted if these holes were fully circular. Also, in the present instance, the hole-engaging portions of the bands 28 and 33 are flat and are initially formed of relatively stiff leather or fabric, whereby, at least while the bands remain relatively inflexible transversely of their planes, the hole bores may coact with the bands to limit their swinging movement about the pivotal connection provided for them at the holes, it being noted that the band portions engaged in the holes have a width greater than the widths of the holes as measured from their straight sides. In the case of the bosal strap 28, the described coaction of the band ends in the holes 26 may limit the downward swinging of the band to support it in or adjacent its desirable operative relation to the front of a horse's nose, and this may permit an omission of the hold-up strap 30 in some instances. In the case of the curb band 33, its described engagement in the holes 32 is operative to limit the upward swinging of the band under the horse's chin, and so prevent its disposal at an undesirably high point under the chin.

Referring particularly to Figure 5, it will now be noted that the bit ends are loosely held in the cheek-plate openings 22 to permit some angular movement of the plates with respect to the bit, or vice versa; such an arrangement is a desirable and preferred one for a bridle of the present type. Preferably, and as shown, the bores of the holes 22 are stepped to provide larger bore portions to receive the unreduced bit portions adjacent the bases of the reduced bit portions 23. The extreme and threaded bit end portions 35 which mount the nuts 24 are still further reduced to provide shoulders which determine the outer ends of the portions 23, and the latter portions are slightly longer than the bore portions which receive them. The arrangement is understood to provide the desired loose engagement of the bit ends with the cheek-plates while securing the bit to the plates. It will be noted that the extension of the unreduced bit portions into the counterbores of the openings 22 is designed to prevent a catching and pinching of an animal's lip which may occur if the counterbores are not provided.

In the case of a straight bit, as the bit 21 illustrated, the bit portions 23 may be cylindrical, since rotation of the bit about its axis may be permitted. If, however, the rotation of the bit about its axis should not be desirable, as for a curb bit, the reduced bit portions and the plate hole portions which receive them may be of complementary polygonal form as one possible means to provide the desired loose fit engagement of the bit ends with the cheek-plates while preventing the rotation of the bit in its mounting. To rigidly connect the bit and cheek-plates, it is merely necessary to insert washers of suitable thickness between the nuts 24 and the outer face of the cheek-plates, or mount washers of like thickness on the reduced bit portions 23, the tightening of the nuts 24 providing the rigid connection.

In fitting the present bridle to a horse's head, the lengths of the cheek straps 7 and curb band 33 and bosal band 28 are adjusted to dispose the bit-mounting holes 22 in substantially the proper bit line for the horse's mouth. As indicated in Figure 1, the curb band 33 will generally fit in the chin groove above the lower lip while the bosal band 28 extends from the pair of cheek-plate openings at which it is attached and in more or less parallel relation to the band 33, its position being determined by the strap 30 or the action of the D-shaped hole at which it is mounted. As indicated, the normally positioned bands will be found to lie in planes substantially perpendicular to the common plane of the cheek straps, it being noted that the latter plane is substantially parallel to the front line of a horse's head.

Recalling that the skull structure of a horse become cartilaginous and more yielding and more sensitive toward the nose tip at the nostrils, a bosal band 28 extending from the upper holes 26 in approximately perpendicular relation to the plane of the cheek straps 7 is arranged to engage the nose front opposite bone structure. On the other hand, a band 28 extending from the lower holes 26 is arranged to engage the nose opposite a cartilaginous and compressible and sensitive portion over the nostrils. The spacing of the extreme holes 26 of their row is such as to provide for the desired range of engagement of the band 28 with the nose, and intermediate holes may be provided between the extreme said holes; in the present instance, but one such intermediate hole 26 is shown. With respect to the location of the holes 26 on the cheek-plates, it is to be noted that the effective pivot axis adjacent the pin 18 lies relatively close to all lines from the hole 32 to the different holes 26 in the angle between the upper and lower said lines; this relation provides for an immediate hackamore action without any initial loosening of one or both bands 28 and 33 as a cheek-plate is rocked for purposes of control.

When the bosal band 28 extends from the upper hole 26, as in Figures 1 and 3, a pull on a rein 14 will rock the corresponding cheek-plate 12 about a point of the plate in or adjacent the pivot pin 18, and pull the bands 28 and 33 toward each other to squeeze the horse's nose between them, this action occurring because of the location of the effective pivot point for the cheek-plate, whereby the effect of rocking the cheek-plate is to swing both of said holes 26 and 32 closer to the plane of the cheek straps. When the bosal band 28 is secured at the lower holes 26 as shown in Figure 4, the pinching action between the bands is very much greater than before because of the position of the engaged hole 26 appreciably below the pivot pin 18. Since, however, the pulling point for the band 33 has not changed, the motion of the band 28 toward the plane of the cheek strap 7 is very much greater than that of the band 33 and may, if the cheek-plate is swung sufficiently, entirely cut off the wind at the nostrils as an ultimate control means. The use of an intermediate hole 26 as the band-mounting point will, of course provide for a corresponding intermediate degree of hackamore severity. It will be noted that the pull of the bands by the cheek-plate does not tend to shift the bearing points of the bands, and thus avoids chafing.

It will be understood that if only one rein is pulled, the other cheek-plate will retain its normal position in which the line of the upper hole 26 and the hole 33 is substantially perpendicular to the plane of the cheek straps. It will also be understood that pulling on one rein will provide a guiding control, while pulling on both reins will provide a restraining or stopping control, the degree of control depending on the chosen point of adjusted attachment of the bosal band to the cheek-plates.

It will now be noted that when the present bridle lacks a mouth bit and functions purely as a hackamore, that the effective pivotal axis for the cheek-plates will be substantially in the line of the pivot pins 18. When a bit is engaged in the described manner with and between the cheek-plates 12, the relatively independent rocking of the cheek-plates may be effected as before, but the first portion of the cheek-plate rocking movement caused by a pull on a rein 14 will engage the bit against the lower jaw of the horse and further rocking of the cheek-plate will thereafter bring the bosal and curb bands into action without increasing the pressure on the jaw; in this manner a colt or horse which has learned to obey the action of the purely hackamore bridle lacking a bit may readily learn to obey the bit without finding it a punishing element against its jaw. When the hackamore and bit combination is provided, the normal fit of the curb band 33 may be somewhat closer than that of the bosal band 28, it being understood that the relative fits of these bands would be varied to suit each particular horse and the severity of control desired.

It is to be understood that the adjusted mounting and positioning of the bosal band 28 with respect to the cheek-plates would always be such as will give the least severe control usable for a given horse; after a horse has been broken and/or trained properly with this bridle, the band 28 may extend from the upper holes 26 exclusively. It is also to be noted that the present bridle is adapted and designed for continued use with a horse after the training of the horse has been completed with it, or may be used without reference to its training features.

From the foregoing description taken in connection with the accompanying drawing, the advantages of the construction and method of operation will be readily understood by those skilled in the art to which the invention appertains. While I have described the features and the principle of operation of a structure which I now consider to be a preferred embodiment of my invention, I desire to have it understood that the showing is primarily illustrative, and that such changes may be made, when desired, as fall within the scope of the following claims.

I claim:

1. In a hackamore bridle, a head-stall including cheek straps, complementary cheek-plates depending from said cheek straps in mutually opposed relation, a curb band for connecting corresponding rearward points of the cheek plates for the rearward extension of its loop transversely of the common plane of the cheek straps, a bosal band for connecting corresponding forward points of the cheek-plates for the forward extension of its loop transversely of said common plane of the cheek straps, means to attach the ends of said bands to said cheek-plates at corresponding different points thereof for selected and different mutual spacings of the planes of the transversely extending bands with the bosal band no higher than the curb band, and means to rock said cheek-plates in their planes for effecting a cooperative and forcible control gripping by the bands of the nose of an animal wearing the bridle.

2. In a hackamore bridle, a head-stall including cheek straps, cheek-plates dependingly supported on said cheek straps, a curb band connecting corresponding rearward points of the cheek-plates for the rearward extension of its loop transversely of the common plane of the cheek straps, a bosal band for connecting corresponding forward and fixed points of the cheek-plates for the forward extension of its loop transversely of said common plane of the cheek straps, means to attach the ends of said bosal band to said check plates selectively and at corresponding different forward and fixed points thereof along their lengths and no higher on the cheek-plates than the points of attachment of the curb band, and means to rock said cheek plates in their planes for effecting a joint and forcible control gripping by the bands of the nose of an animal wearing the bridle.

3. In a bridle, complementary and mutually opposed cheek-plates supported for rocking in their planes, a curb band connecting corresponding rearward points of the cheek-plates, a bosal band, means connecting the ends of said bosal band to said cheek-plates selectively at corresponding different forward points of the cheek-plates which are no higher thereon than are the points connected by the curb band, and means operative to rock said cheek-plates in their planes for effecting a cooperative and forcible control gripping by the bands of the nose of an animal wearing the bridle.

4. In a bridle, complementary and mutually opposite check-plates supported at corresponding upper points thereof for rocking in their planes, a curb band connecting corresponding rearward points of the cheek-plates, a bosal band, means connecting the ends of said bosal band to said cheek-plates selectively at corresponding different forward points of the cheek-plates which are no higher thereon than are the points connected by the curb band, means operative to rock said cheek-plates in their planes for effecting a cooperative and forcible control gripping by the bands of the nose of an animal wearing the bridle, and a mouth bit connecting the cheek plates at corresponding points thereof which are relatively close to and below the plate support points.

5. In a bridle, complementary and mutually opposed cheek-plates supported at corresponding upper points thereof for rocking in parallel planes, a curb band connecting corresponding rearward cheek-plate points above said support points thereof, a bosal band connecting said cheek-plates selectively at corresponding different forward points of the cheek-plates which are no higher thereon than are the points connected by the curb band and define upright lines thereof on the cheek-plates, means operative to rock said cheek-plates in their planes for effecting a cooperative and forcible gripping by the bands of the nose of an animal wearing the bridle, and a mouth bit connecting the cheek-plates at corresponding points thereof which are adjacent and below the plate support points and are laterally opposite and rearwardly of the line of connection points for the bosal band.

JOHN J. SCHMELZ.